United States Patent [19]

Pelletier

[11] Patent Number: 4,766,521
[45] Date of Patent: Aug. 23, 1988

[54] CONNECTING BLOCKS FOR TELEPHONE SYSTEMS

[75] Inventor: Claude Pelletier, Laval, Canada

[73] Assignee: Northern Telecom Limited, Montreal, Canada

[21] Appl. No.: 52,925

[22] Filed: May 22, 1987

[51] Int. Cl.⁴ .............................................. H01R 9/24
[52] U.S. Cl. .................................... 361/426; 361/428; 379/329; 439/142
[58] Field of Search ....................... 361/426, 428, 429; 379/328, 329, 397; 439/131, 142

[56] References Cited

U.S. PATENT DOCUMENTS

| | | |
|---|---|---|
| Re. 29,371 | 8/1977 | De Bortoli et al. ................. 361/426 |
| 3,904,936 | 9/1975 | Hamrick, Jr. et al. ............. 361/428 |
| 4,331,839 | 5/1982 | Baumbach ........................... 361/426 |
| 4,538,868 | 9/1985 | Cruise et al. ........................ 439/131 |

FOREIGN PATENT DOCUMENTS 2428783  2/1975  Fed. Rep. of Germany ...... 361/426

*Primary Examiner*—A. D. Pellinen
*Assistant Examiner*—Gregory D. Thompson
*Attorney, Agent, or Firm*—R. J. Austin

[57] ABSTRACT

A connecting block with a terminal support member which is pivoted upon a housing and movable between an operational position in which it depends from its hinge points at the front of the housing to a withdrawn position of the support member extending upwardly from the hinge points. The support member, in its operational position, extends to upper, lower and side boundaries of the housing. Wire guide projections and a cover are carried by sides extending between front and rear faces of the support member and at corners of the support member to maximize the frontal area of the support member for acceptance of electrical terminals.

6 Claims, 3 Drawing Sheets

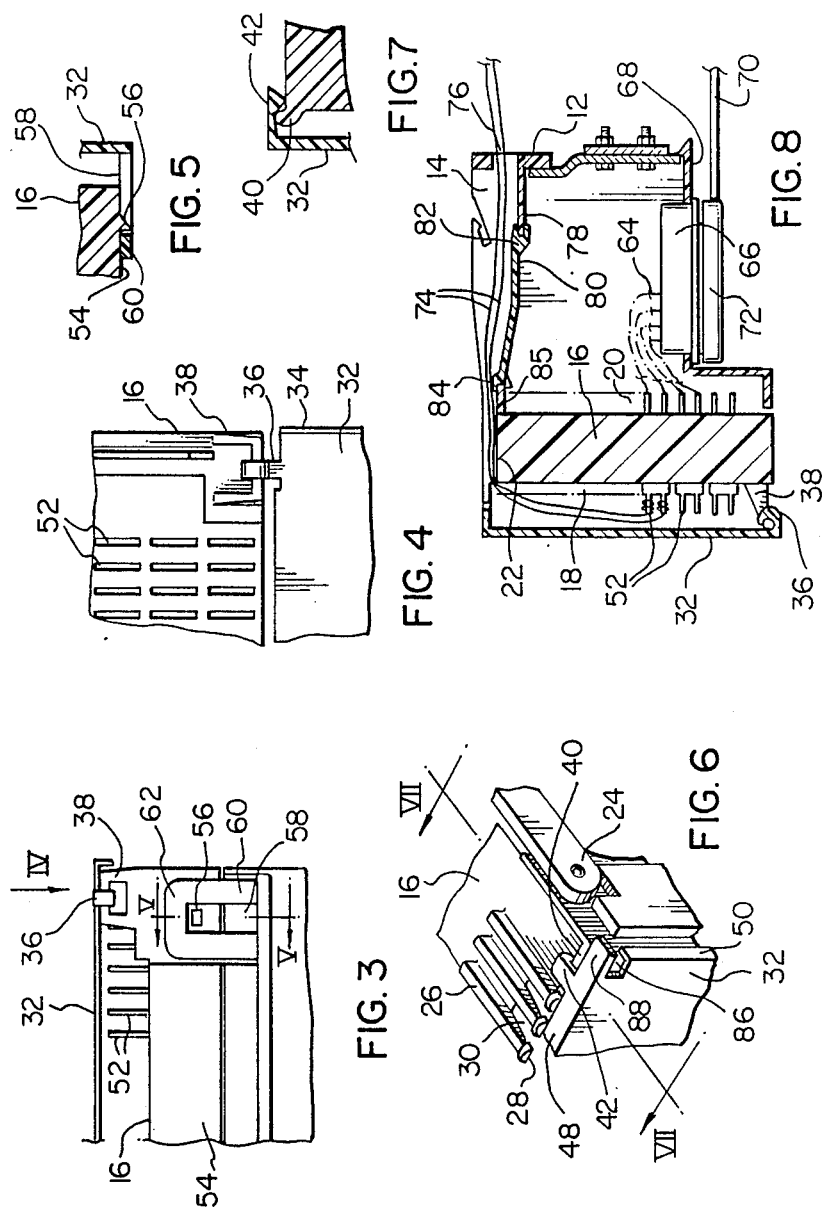

CONNECTING BLOCKS FOR TELEPHONE SYSTEMS

FIELD OF THE INVENTION

This invention relates to connecting blocks for telephone systems.

BACKGROUND OF THE INVENTION

Connecting blocks for telephone systems are used in a variety of locations and the design of any particular block depends upon its use. For use in central office locations, connecting blocks comprise a housing carrying a terminal support member through which a matrix of electrical terminals extends. Incoming conductor wires extend to the terminals on one face, i.e. the rear face, of the support member and outgoing conductor wires extend from the terminals at the other or front face. A problem which existed with obtaining working access to the terminals on both faces of the support member has been solved with a connecting block as described in U.S. Pat. No. Re. 29,371, entitled "Connecting Block" in the names of G. Debortoli and H. H. Lukas, reissue date Aug. 23, 1977. As described in that patent, the support member is pivotally positioned upon a housing to enable it to be located with either the front or the back faces facing forwardly for ease of working access to both ends of the terminals.

The structure described in U.S. Pat. No. Re. 29,371 includes a cover for the front face of the support member in the normal use position of the block. Guides are provided for outgoing wires to lead them from the front face to the rear of the housing and hence to a framework which carries a group of connecting blocks and conveys the incoming and outgoing wires to individual blocks. These guides are provided at one side of the support member, i.e. extending between front and rear faces, and this side and one edge of the cover also provide cooperating latching parts for holding the cover in a closed position. The structure of the cover and support member are such that the guides and latching parts are bulky. This, together with a hinge arrangement for the cover adjacent another and remote side of the support member, restrict the possible terminal matrix regions of the support member so that, for a given frontal area of the block, e.g. approximately 8 inches×4 inches, only two hundred terminals can be carried by the support member.

It would be advantageous that for a given frontal area of the block, more terminals could be carried by the support member.

SUMMARY OF THE INVENTION

The present invention provides a connecting block with a housing and terminal support member pivotally connected to a front of the housing. The terminal support member is pivotally movable between an operational position in which it depends from its hinge points and a withdrawn position in which it extends upwardly from the hinge points. In the operational position, the terminal support member closes the front of a chamber defined by the housing while it extends to upper, lower and side boundaries of the housing. Regions are provided for terminals to extend through the terminal support member from one of its faces to the other. To maximize the regions of the terminal support member available for terminals, thereby maximizing the potential number of terminals, the face areas of the support member are unobstructed except at corner regions. A row of guide projections for conductor wires is provided along one side of the support member which lies at its upper boundary when it is in its operational position. Two corner regions of the terminal support member remote from the guide projections are hingedly connected to a cover. At the corner regions of the side formed with the guide projections, the terminal support member has parts of a flexible retaining means for the cover, other parts of the retaining means provided at two corner regions of the cover. These corner regions of the cover also have parts of a locking means to stabilize the terminal support member when it is in its withdrawn position. The other parts of the locking means are provided by upper regions of the housing sides. The guide projections may be formed by molding a plurality of parallel guide ribs extending between the rear and front faces and extending beyond the front face.

In a preferred construction, the flexible retaining means comprises a latch at each of the corresponding two corner regions of the cover. A latch retaining rib is provided for each latch on the side of the support member having the guide projections. Also, it is preferable for the cover to have edge flange means and the latches of the retaining means are extensions of the flange means. Advantageously, the cover is formed with a recess at each of the second two corner regions and each recess extends through the flange means to form a protrusion on the flange means at the associated corner region. This protrusion forms part of the locking means which also comprises an edge region of each side of the housing which defines a slot in the side to receive an associated protrusion to detachably hold the cover.

It has been found that with the preferred arrangement in the given size of block, e.g. approximately 8 inches×4 inches, then at least two hundred and fifty-six terminals may be accommodated in the matrix because of the increase in size of the support member available for terminal support.

BRIEF DESCRIPTION OF THE DRAWINGS

One embodiment of the invention will now be described, by way of example, with reference to the accompanying drawings, in which:

FIG. 3 is a view in the direction of arrow III in FIG. 1 and showing a latch arrangement for holding a terminal support to a housing;

FIG. 4 is a detail of the block taken in the direction of arrow IV in FIG. 3 with the cover hinged away from a covering position and to a larger scale than FIGS. 1 and 2;

FIG. 5 is a cross-sectional view taken along line V—V in FIG. 3;

FIG. 6 is an isometric view on a larger scale than FIG. 1 and showing a corner detail;

FIG. 7 is a cross-sectional view taken along line VII—VII in FIG. 6;

FIG. 8 is a cross-sectional view through the block taken along line VIII—VIII in FIG. 1.

DETAILED DESCRIPTION

Figure 1:
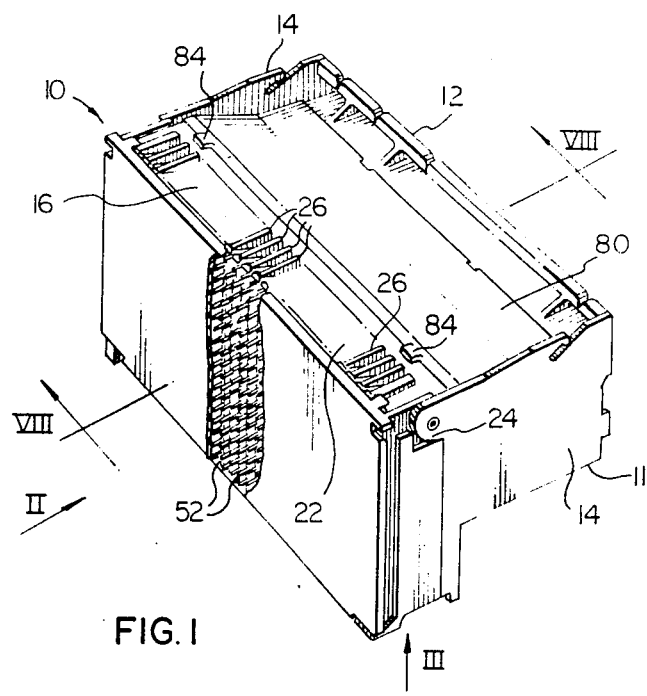
FIG. 1 is an isometric view of a connecting block according to the embodiment.
Figure 9:
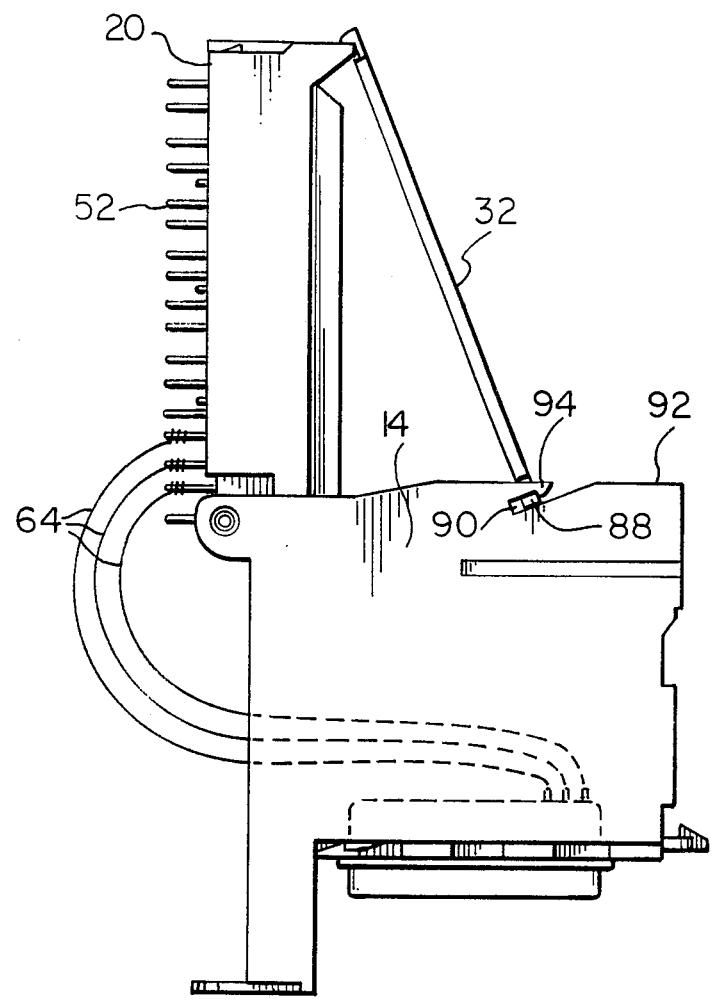
FIG. 9 is a side elevational view of the block and showing the support member in a different position from that shown in other figures.

The connecting block 10 shown in FIG. 1 comprises a housing 11 of molded plastic and having a rear 12, two forwardly extending sides 14 and an open front. The connector block also comprises a terminal support member which is in the form of a planar block 16 of molded plastic insulating material, the block having front and rear faces 18 and 20 (see particularly FIGS. 8 and 9). The support member is substantially rectangular in plan view and has four sides extending between its rear and front faces. The support member is pivotally mounted adjacent to one longitudinal side 22 between forwardly extending projections 24 of the sides 14 of the housing. As can be seen from a front view in FIG. 2 and also with respect to other figures, the support member in its use position extends across the open front of the housing and also extends substantially to the boundaries of the housing itself.

Figure 2:
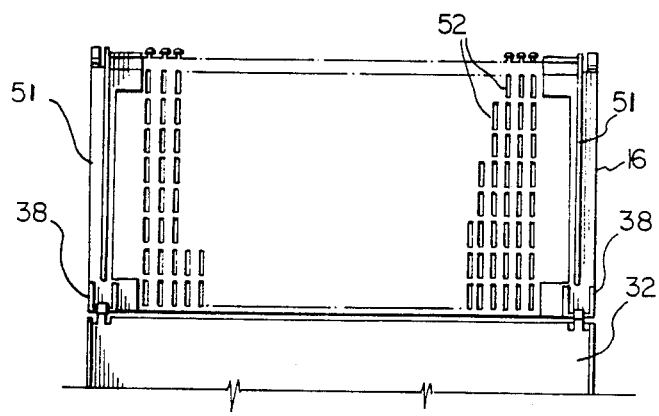
FIG. 2 is a front view of the block taken in the direction of arrow II in FIG. 1 and with a cover hinged away from a covering position.

At the side 22, the support member is provided with a row of laterally spaced-apart and forwardly extending conductor wire guide projections 26. These are formed as ribs which extend across the side 22 from the rear face forwardly and beyond the forward face to terminate in slightly enlarged forward ends 28. The projections 26 thereby define guide spaces 30 between them (FIG. 6) for passage of conductor wires from terminal connections (to be described) at the front face of the support member. As can be seen, because of the relative dimensions of the housing and of the support member, then the projections lie at the boundary of the housing in front view as shown in FIG. 2.

The connector block is also provided with a cover for covering the front face of the support member. The cover 32 is hinged along one longitudinal side at two opposite end corner regions 34 by hinge parts 36 molded integrally with the cover and complementary hinge parts 38 molded forwardly from the front face of the support member (FIGS. 3, 4 and 8). The hinged parts 38 are disposed in corner positions of the support member remote from the side 22.

The cover and support member have cooperable flexible retaining means to retain the cover in its covering position, i.e. covering the front face. The flexible retaining means comprises two latch retaining ribs 40 (FIGS. 6 and 7) disposed one at each end of the row of projections 26 are formed integrally with the support member along the side edge 22. As can be seen from FIG. 6, each rib lies transversely to the direction of the projections 26. The flexible retaining means also comprises two latches 42 formed integrally with the cover in opposite corner regions remote from the hinge parts 36. As can be seen particularly from FIG. 6, for stiffening purposes the cover has edge flange means in the form of flanges 48 and 50 along adjacent edges and the latches 42 are formed as extensions of the flange 48. The latches are resilient upon the flange 48 and during pivotal movement of the cover into and out of its covering position, the latches ride over the ribs 40 into and out of their locking position. As shown in FIG. 7, the cover 32 is held in its covering position with the latches 42 disposed over the projections 40.

It is noticeable that with the construction described in the embodiment, the flange 48 is substantially in alignment with the projections 26 as the cover and the support member each extend substantially to the boundary of the housing in front view so that the conductor wire guide spaces 30 are substantially enclosed by the side 22, the projections 26 and the flange 48.

As can be seen from the above description, the terminal support member is of maximum frontal and rear area commensurate with the frontal size and shape of the housing. In addition to this, the corner hinge positions for the cover and the boundary positions of the guide projections 26 and latch retaining ribs 40 ensure that there is a maximized region of the support member which may be used for location of terminals between rear and front faces in a matrix. This can be seen clearly from FIG. 2 in which all of the support member unoccupied by the hinge position 38 and strengthening regions 51 along the side edges is utilized for holding terminals. It has been found that in the embodiment, with the given frontal area of the block, i.e. 8 inches × 4 inches, there may be two hundred and fifty-six terminals easily accommodated by the block. This is clear from FIG. 2 in which in the matrix, there is a rectangular terminal holding region providing thirty-two rows of terminals 52 horizontally and eight rows of terminals vertically. If desired, further terminals may be located in the region above each hinge position 38 and the latch retaining rib above it, i.e. at each side of the matrix of two hundred and fifty-six terminals.

It can be seen therefore that with the construction according to the invention and as described in the embodiment, there is a maximization of the terminals which may be held in the support member.

It is a further feature of this embodiment that means is provided for detachably securing the support member in its use position covering the open front of the housing. As shown particularly by FIGS. 3 and 5, this means comprises a latching arrangement which is associated with the side 54 of the support member remote from side 22. As the latching means is on the side 54, then it does not occupy room in the support member which may otherwise be occupied by the terminals. As shown by FIGS. 3 and 5, the latching arrangement comprises a latch engaging rib 56 formed integrally with the side 54 at each end of the support member. The latch engaging rib 56 is engageable within a slot 58 formed in a U-shaped support member retaining latch 60, the two legs of which extend forwardly from the housing and are joined by a base 62 which locates behind the latch engaging rib 56 as shown in the figures. The latch 60 is resiliently flexible upon the housing to enable it to be flexed over the rib to move the support member into and out of its use position.

In the use position of the support member as shown by FIG. 8, the terminals 52 are connected at the rear face by conductor wires 64 which extend also into part 66 of a mating connector. The part 66 is mounted upon a removable plastic base 68 of the housing which is held between the two sides in any acceptable manner. An incoming cable 70 has the other part 72 of the mating connector attached to it and the two parts 66 and 72 are connected together as shown in FIG. 8. At the forward face 18 of the support member outgoing conductor wires 74 are attached. The wires 64 and 74 may be attached by any known and acceptable means, but in this embodiment they are attached by wire wrapping techniques as illustrated in FIG. 8. The outgoing wires 74 pass through the guide spaces 30 between the projections 26 and then downwardly between the sides 14 of the housing and through wire receiving apertures 76 at the top of the rear 12 of the housing. As can be seen also from FIG. 8, the housing is integrally formed with a narrow platform 78 extending forwardly from the rear 12 and a cover 80 is located between the forward end of the platform and the top of the support member when the support member is in the use position. This cover 80 is made of resilient plastics material which is resiliently flexed into position by reception of a bifurcated side 82 around the forward end of the platform 78 and the other edge of the cover has two upwardly extending fingers 84 which are spaced from a lower edge of the cover (FIGS. 1 and 8) to define a groove which accepts a rearward extension 85 from the support member. It can be seen therefore that the wiring from the rear face of the support member to the mating connector is substantially enclosed.

As may be seen from FIG. 8 particularly, it is a simple matter for the wires 74 to be connected to the terminals 52 at the front face of the support member. To enable the wires 64 to be connected to the rear face, it is necessary for the support member to be pivoted out of its use position shown in FIG. 8 and into a second position shown in FIG. 9 in which the support member lies above the sides 14 of the housing and the rear face 20 faces forwardly. In this position, as may be appreciated, the wires 64 are easily connected to the rear ends of the terminals 52.

To enable the support member to be held in its second position 20 during connection of the wires 64 to the terminals, a locking means is provided between the sides 14 of the housing and the cover. This locking means is provided in part by the provision of a slot 86 at each side edge of the cover having a flange 50 (FIG. 6), the slot 86 lying adjacent to the flange 48 whereby there is a protrusion 88 formed at each end of the flange 48. Thus, this part of the locking means is formed in the same corner region as the latch 42 which holds the cover in its covering position. The locking means also comprises two slots 90 (FIG. 9) extending obliquely into the upper edge regions 92 of sides 14 of the housing. These slots are preferably provided with inwardly extending localized projections 94 near their entrances. As can be seen from FIG. 9, when the support member is moved into its second position, the protrusions 88 on the covers may be moved along the slots 90 by merely pivoting the cover away upon the support member. It will be appreciated that as the protrusions move past the projections 94, some resistance to movement is encountered and then the protrusions enter the bases of the slots 90. The projections 94 provide resistance to any inadvertent movement of the protrusions out of the slots 90.

What is claimed is:
1. A connector block comprising:
 a housing having a rear and sides extending forwardly from the rear to enclose a chamber;
 a terminal support member pivotally carried at two spaced pivotal locations at upper portions of the sides of the housing forwardly of the rear, the support member being pivotally locatable alternatively in a use position and a position withdrawn from the use position, the support member in the use position depending from its pivotal locations and lying between the housing sides to close the front of the chamber with the support member extending to upper, lower and side boundaries of the housing, and the support member in the withdrawn position extending upwardly from the pivotal locations;
 the terminal support member having two generally rectangular faces and sides extending between the faces, one of the faces being a front face and the other face a rear face in the use position of the support member and one of the sides facing upwardly and another downwardly in said use position;
 the side which faces upwardly in the use position, formed with a row of laterally spaced apart conductor wire guide projections which lie at the upper boundary of the housing with the support member in the use position, extend forwardly of the front face and define wire guide spaces which face downwardly across the front face;
 a cover for the support member, the cover hingedly connected to the support member at two hinge positions of the support member which are disposed at lower corner regions of the front face in the use position;
 the cover and the support member having cooperable flexible retaining means to retain the cover in a position covering the front face of the support member, said retaining means formed partly at the ends of the upwardly facing side, and also partly at two corner regions of the cover;
 the support member formed with terminal holding locations extending through the support member from face-to-face with some of the terminal holding locations extending along a lower edge region of the front face between the hinge positions at the lower corner regions and other terminal holding locations extending along an upper edge region of the front face between the upper corner regions of the front face;
 a latching arrangement for detachably connecting the support member to the housing when the support member is in the use position, the latching arrangement provided partly upon the downwardly facing side of the support member and partly upon the housing; and
 said corner regions of the cover and upper regions of the housing sides having cooperable locking means to detachably hold said corner regions of the cover and stabilize the support member when the support member is in its withdrawn position with the cover pivotally moved out of its covering position on the support member.

2. A connector block according to claim 1 wherein terminal holding locations are provided along edge regions of the support member between each lower corner region of the support member and an upper corner region above each lower corner region.

3. A connecting block according to claim 1 wherein the flexible retaining means comprises a latch retaining rib at each end of the row of guide projections on the support member, the latch retaining rib formed on said upwardly facing side of the support member and extending transversely to the direction of the projections, and a latch at each of said corner region of the cover, each latch engageable over an associated latch retaining rib in the covering position of the cover.

4. A connecting block according to claim 3 wherein the cover has edge flange means and the latches of the cover are estensions of the edge flange means.

5. A connecting block according to claim 4 wherein each of said two corner regions of the cover has a protrusion on the flange means, said protrusion forming part of the locking means and being produced by a recess formed through the flange means at said corner region to form a discontinuity in the flange means adjacent said protrusion, and the upper edge region of each side of the housing is formed with a slot to receive one of the protrusions to hold the corner regions of the cover.

6. A connecting block according to claim 5 wherein the upper edge region of each side of the housing is formed with a protrusion engaging projection which extends into and narrows the slot adjacent its entrance to resist movement of the protrusion from the slot.

* * * * *